United States Patent [19]

Pausch

[11] Patent Number: 5,143,468
[45] Date of Patent: Sep. 1, 1992

[54] ARTICULABLE JOINT AND SUPPORT FRAME FOR EXHAUST HOSE

[75] Inventor: Josef Pausch, Hopkins, Minn.

[73] Assignee: General Resource Corporation, Hopkins, Minn.

[21] Appl. No.: 680,948

[22] Filed: Apr. 5, 1991

[51] Int. Cl.⁵ ............................................. F16D 3/00
[52] U.S. Cl. ...................................... 403/92; 403/96
[58] Field of Search .................. 251/297; 137/615; 403/92, 93, 96

[56] References Cited

U.S. PATENT DOCUMENTS

| | | |
|---|---|---|
| 907,151 | 12/1908 | Kjellin et al. |
| 1,115,450 | 10/1914 | Parizek . |
| 1,129,530 | 2/1915 | Trask . |
| 1,159,529 | 11/1915 | Parizek . |
| 1,207,270 | 12/1916 | Braithwaite . |
| 1,212,475 | 1/1917 | Gillies . |
| 2,161,070 | 6/1939 | McDonough ............... 251/297 X |
| 2,394,487 | 2/1946 | Rotter et al. ............... 251/297 X |
| 2,910,267 | 10/1959 | Holby ......................... 251/297 X |
| 3,119,591 | 1/1964 | Malecki . |
| 3,433,511 | 3/1969 | Frankel . |
| 3,579,712 | 5/1971 | Smith . |
| 4,829,633 | 5/1989 | Kassner . |
| 4,832,299 | 5/1989 | Gorton et al. ............... 403/92 X |
| 4,881,843 | 11/1989 | Randleman . |
| 4,890,950 | 1/1990 | Yoo ........................... 403/96 |

Primary Examiner—John C. Fox
Attorney, Agent, or Firm—Palmatier & Sjoquist

[57] ABSTRACT

An articulable joint with two opposing disk-like joint portions or plates which are joined by and pivot about a central locking bolt. The joint portions also engage each other via ball and ball seat contact points. Spring pressed balls on one joint portion are biased into ball seats formed in the other joint portion such that the joint may be pivoted incrementally to a number of positions. The spring pressed balls are separately housed in individual ball plungers which in turn are threaded into its respective joint portion such that the ball plungers are selectively adjustable to vary the amount of turning or pivoting force that is required to unseat the balls from their respective seats and move them to respective adjacent seats.

9 Claims, 2 Drawing Sheets

ARTICULABLE JOINT AND SUPPORT FRAME FOR EXHAUST HOSE

BACKGROUND OF THE INVENTION

Flexible exhaust hoses for venting fluids such as fumes or smoke are typically mounted on and depend from ceilings, or from elevated ductwork which is generally located above the point where such pollution is generated. Accordingly, the flexible hoses may require semirigid support means for being stably oriented close to the source of the fumes or smoke.

SUMMARY OF THE INVENTION

An object of the present invention is to provide an articulable joint that is capable of supporting a relatively heavy load without moving, yet is relatively easy to articulate.

Another object of the present invention is to provide an articulating joint that articulates in response to a predetermined, adjustable force.

A feature of the present invention is the provision in an articulable joint with two opposing joint portions being generally disk-like in shape and articulating about a central axis of one of the joint portions having spring pressed balls for engaging ball seats formed in the other joint portion whereby the joint portions may be releasably locked to each other in a number of positions.

Another feature is the provision in such an articulable joint, of the spring pressed balls being housed in ball plungers which are threadably engagable with one of the joint portions to vary the force with which the balls engage the ball seats and thus the force of turning the joint portions with respect to each other.

Another feature is the provision in such an articulable joint of the balls and ball seats being arranged in circular form.

Another feature is the provision in an articulable support frame having a pair of first and second elongate arms and an articulable joint connecting the elongate arms, of the joint having joint portions which are releasably locked to each other via spring-pressed balls housed in ball plungers which threadably engage one of the joint portions to vary the force of articulation by varying the pressure of the balls against respective ball seats.

Another feature is the combination of such an articulable support frame with a flexible conduit for conveying a fluid.

Another feature is the provision in such an articulable support frame and flexible conduit combination of the articulable support frame being mounted outside of the flexible conduit.

An advantage of the present invention is that it supports a relatively heavy load yet is readily articulable.

Another advantage is that it may be customized to support a load of a particular weight.

Another advantage is that the force required for articulation of the joint is adjustable.

Another advantage is that large hoods for venting fumes may be readily swung upwardly to an unobtrusive position.

Another advantage is that hoods for venting fumes may be readily oriented to a variety of positions.

Another advantage is that the present invention renders the operation of a hood and exhaust hose more user-friendly to increase the chances that hoods will be used by workers to vent toxic fumes and other contaminants from the workplace.

Another advantage is that the present invention is simple and inexpensive to fabricate, and easy to install, operate, and maintain.

DETAILED DESCRIPTION OF THE PREFERRED EMBODIMENT

Figure 1:
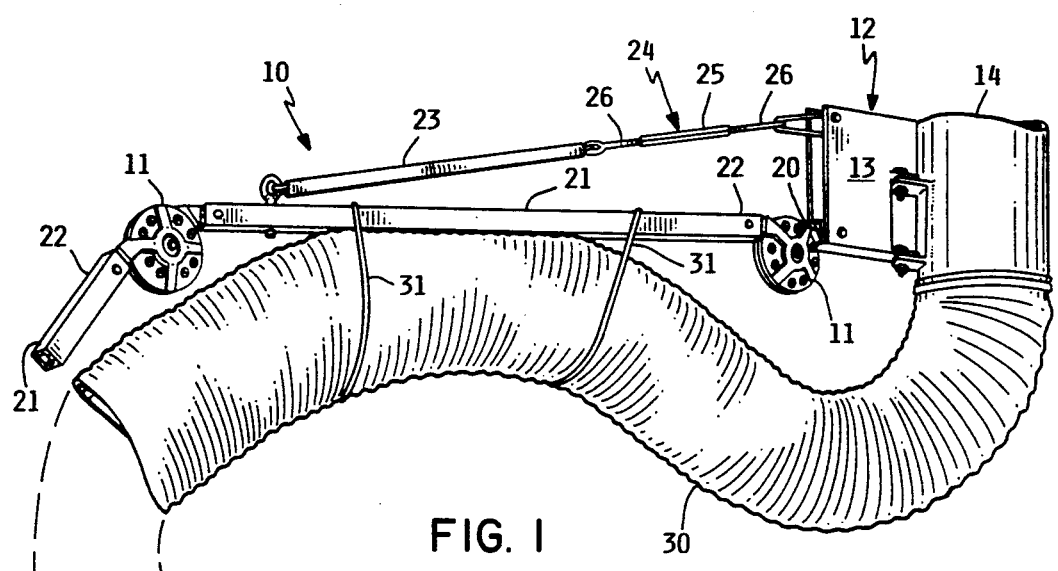
FIG. 1 is a perspective view of the articulable joint and support frame for an exhaust hose.

As shown in FIG. 1, the present articulable joint and support frame is indicated in general by the reference numeral 10. It includes one or more articulable joints 11 connectable to a support frame 12 which in turn includes plate sections 13 pivotally affixed to a rigid exhaust conduit 14. The rigid conduit 14 typically depends from a ceiling for venting fumes exteriorly of the building.

The support frame 12 includes a tubular end 20 affixed between plate sections 13 and connectable to one articulable joint 11, and elongate tubular arms 21 with tubular end portions 22 connectable to the articulable joints 11. An elongate coil spring 23 and an adjustable connector 24 may be secured to each other and extend between one elongate arm 21 and the pivotable plate sections 13 for supporting its respective elongate arm 21. The adjustable connector 24 includes a threaded bored shaft 25 for engaging threaded pin connectors 25 such that the tension in the coil spring 23 is adjustable to raise or lower the elongate arm 21 to which the spring 23 is connected, as well as to raise distal elongate arms 21 and an exhaust hose 30 strapped to the arms 21.

The exhaust hose 30 extends from the rigid conduit section 14 and may be supported by the support frame 12 via cord sections 31 being strapped about it and the elongate arms 21. The exhaust hose 30 includes an inlet hood 32 for drawing in fluids such as toxic fumes from welding, smoke, or other chemical or explosive fumes, or other airborne contaminants such as dust.

Figure 2:
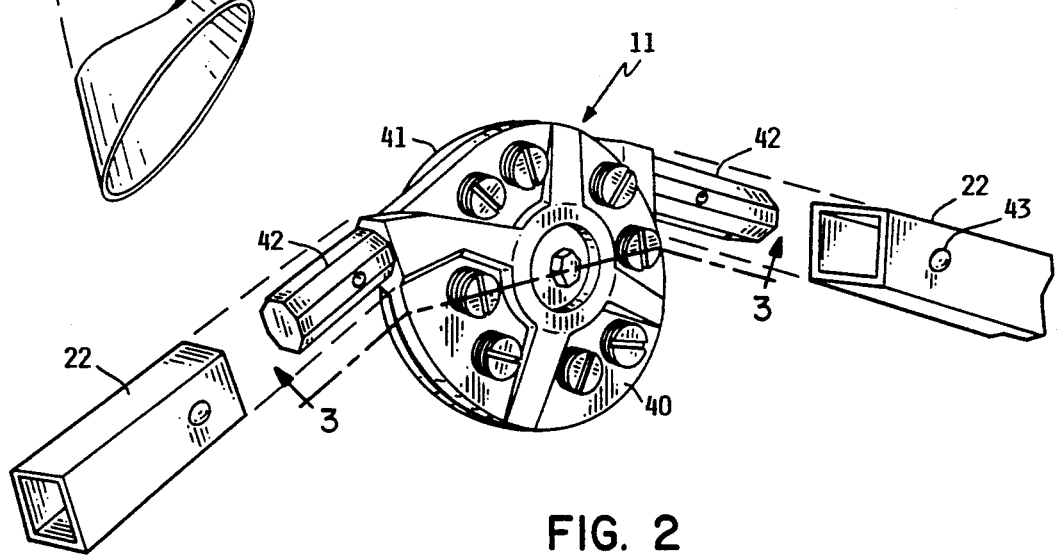
FIG. 2 is a detail perspective view of the articulable joint of FIG. 1.

As shown in FIG. 2, the articulable joint 11 includes two plate or disk-like joint portions 40, 41. Each of the joint portions 40, 41 includes an integral, plug insert 42 for insertion into the tubular ends 22 of the elongate arms 21. Pin connectors 43 threaded through tubular ends 22 may engage the plug insert 42 to secure the articulable joint 11 to the elongate arms 21. It should be noted that the octagonal shape of the plug insert 42 permits an oblique orientation of the articulable joints 11 relative to each other and oblique orientations of portions of the hose 30 relative to other portions of the hose, such that the support frame 12 may follow or track the path of the flexible hose 30.

Figure 5:
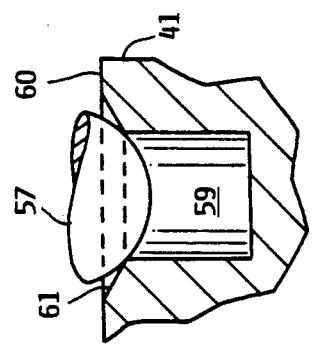
FIG. 5 is an enlarged, partial view of the articulable joint of FIG. 2 showing a ball and ball seat.
Figure 3:
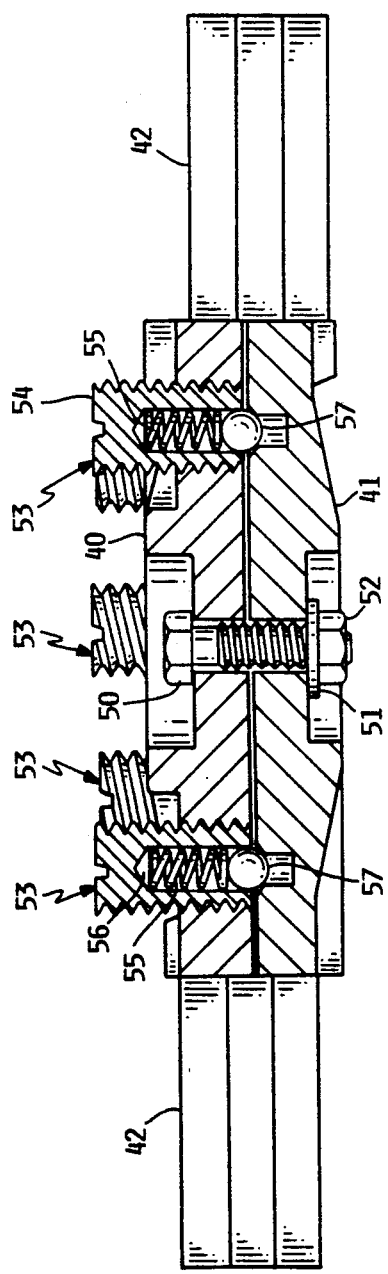
FIG. 3 is a section view at lines 3—3 of FIG. 2.
Figure 4:
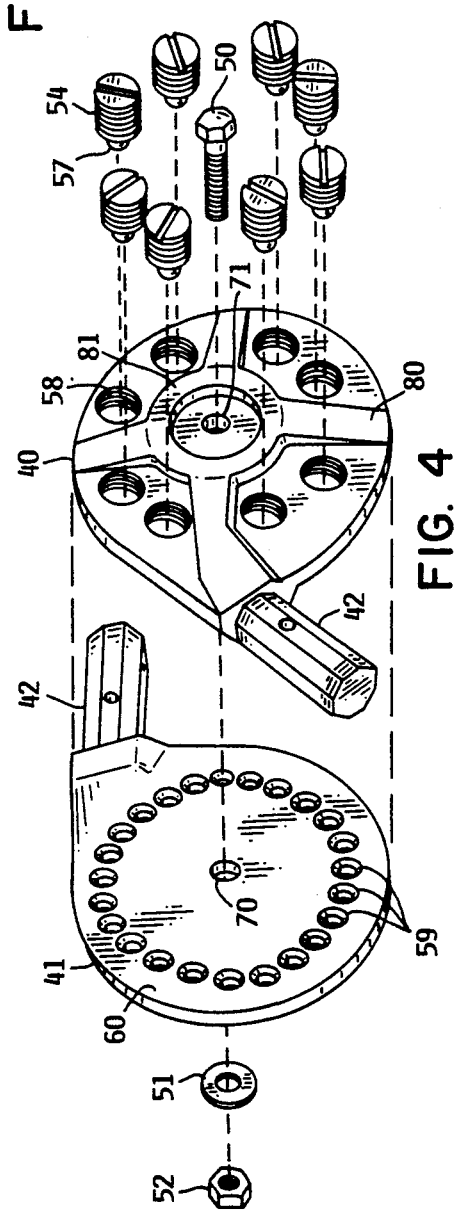
FIG. 4 is an exploded view of the articulable joint of FIG. 2.

As shown in more detail in FIGS. 3, 4 and 5, the disk-like joint portions 40, 41 are pivotally joined by a central locking bolt or pin connector 50 with a washer 51 and nut 52. The disk-like joint portions 40, 41 are spaced apart for articulation via a plurality of ball plungers 53. Each of the ball plungers 53 includes a threaded screw connector 54, a compression spring 55 set in a cavity 56 formed in the screw 54, and a ball 57 having a diameter slightly smaller than the diameter of the cavity 56.

Each of the ball plungers 53 threadably engages one of a plurality of threaded apertures 58 formed in disk-like joint portion 40. Each of the balls 57 of the ball plungers 53 is seated in one of a plurality of ball seats 59 formed in an inner surface 60 of the opposing disk-like joint portion 41. As shown in FIG. 5, each of the ball seats 59 includes an annular beveled portion 61 for facilitating seating and unseating of the balls 59.

As shown in FIG. 4, the arrangement of ball seats 59 define a circle having an aperture 70 at its center, which receives the central locking bolt 50. Likewise, the threaded apertures 58 define a circle having an aperture 71 at its center, which also receives the central locking bolt 50. In the preferred embodiment, the disk-like joint portion 41 includes 24 ball seats for the eight ball plungers 53 of joint portion 40. Accordingly, the joint 11 may be articulated at 15° increments.

As shown in FIGS. 1, 2 and 4, the disk-like joint portion 40 includes reinforcing ribs 80 radially emanating from an annular reinforcing rib or boss 81 surrounding aperture 71. Such ribs 80, 81 may also be formed on the exterior surface of joint portion 41.

In operation, to provide for relatively easy articulation between the joint portions 40, 41, the screws 54 are loosened from their positions shown in FIG. 3. In other words, the screws 54 are turned to be drawn away from surface 60 of joint portion 41 to decompress coil springs 55 and thereby reduce the force which the balls 50 bring to bear on the ball seats 59. It should be noted that to decrease the pivotal force required for articulation between joint portions 40, 41, one or more ball plungers 53 may be loosened. Furthermore, for uniform adjustment of such force, it may be desired to merely loosen (or tighten) two ball plungers 53 which are spaced 180° from each other. Such selective adjustment increases the chances that a proper balance of forces may be attained for supporting a relatively heavy hose 30 for relatively great distances from a central rigid conduit 14 while advantageously providing feather-like articulation for a raising or lowering of the hood 32 from or to the site of welding or source of toxic or explosive fumes.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. An articulable joint for releasably locking two elements relative to each other, comprising:
   (a) a first joint portion connectable to one of the elements and being generally disk-like in shape, the first joint portion comprising a seating inner surface and a sufficient plurality of ball seats formed in the seating inner surface to define a circle;
   (b) a second joint portion pivotally joined to the first joint portion and being generally disk-like in shape, the second joint portion comprising an apertured inner surface for confronting the seating inner surface of the first joint portion, the second joint portion further comprising a sufficient plurality of threaded apertures arranged to define a circle, the first and second joint portions having generally the same circumference;
   (c) a plurality of threaded connectors for respectively engaging the threaded apertures, each of the connectors comprising a cavity, a ball disposable in the cavity, and a coil spring for biasing the ball outwardly of the cavity against one of the respective ball seats whereby each of the balls is engagable with each of the ball seats to releasably lock the joint portions and elements at a number of predetermined positions, and whereby each of the connectors is incrementally adjustable independently of the other connectors.

2. The articulable joint of claim 1, wherein the ball seats outnumber the threaded connectors.

3. The articulable joint of claim 1, wherein each of the elements comprises an elongate arm with a tubular end, and each of the joints further comprises a plug insert for engagement in one of the tubular ends.

4. An articulable support frame, comprising:
   (a) a pair of first and second elongate arms;
   (b) a first joint portion connectable to one of the arms via a first male/female connection and comprising a sufficient plurality of ball seats arranged to define a circle;
   (c) a second joint portion connectable to the other arm via a second male/female connection and the first joint portion, the second joint portion comprising a sufficient plurality of threaded apertures arranged to define a circle, each of the joint portions being generally disk shaped and being coaxial with the other joint portion, each of the joint portions confronting each other, the first and second joint portions having generally the same circumference; and
   (d) a plurality of threaded connectors for engaging the apertures and each of the connectors comprising a cavity, a ball in the cavity, and means for biasing the ball outwardly relative to the cavity for biasing the ball to engage one of the ball seats to thereby releasably lock the joint portions and arms relative to each other, and whereby each of the connectors is incrementally adjustable independently of the other connectors.

5. The articulable support frame of claim 4, wherein the ball seats outnumber the connectors.

6. The articulable support frame of claim 4, wherein the ratio of ball seats to connectors is at least two to one.

7. The articulable support frame of claim 4, wherein the first joint portion includes an inner surface with the ball seats being recessed in the inner surface, each of the ball seats comprising an annular beveled portion leading into the inner surface to facilitate seating and unseating of one of the balls.

8. The articulable support frame of claim 4, wherein the biasing means comprises a coil spring in the cavity.

9. The articulable support frame of claim 4, wherein each of the elongate arms comprises a female tubular end and each of the joint portions comprises a male plug insert for being inserted into one of the tubular ends.

* * * * *